US005130759A

United States Patent [19]

Fushimi et al.

[11] Patent Number: 5,130,759

[45] Date of Patent: Jul. 14, 1992

[54] IMAGE FORMING APPARATUS FOR FORMING AN IMAGE ON BOTH SIDES OF A RECORDING MEDIUM

[75] Inventors: Seiichiro Fushimi, Yokohama; Yoshitsugu Nakatomi, Yokosuka, both of Japan

[73] Assignee: Kabushiki Kaisha Toshiba, Kawasaki, Japan

[21] Appl. No.: 578,236

[22] Filed: Sep. 6, 1990

[30] Foreign Application Priority Data

Sep. 7, 1989 [JP] Japan .................................. 1-230536
Sep. 7, 1989 [JP] Japan .................................. 1-230537

[51] Int. Cl.[5] ............................................ C03G 21/00
[52] U.S. Cl. .................................... 355/319; 271/291
[58] Field of Search ............... 355/321, 308, 317, 318, 355/319, 202, 244; 346/160; 271/3.1, 9, 291, 301, 902

[56] References Cited

U.S. PATENT DOCUMENTS 4,787,616 11/1988 Sasaki et al. .................... 271/291 X
4,864,368 9/1989 Muramatsu ...................... 355/319 X
4,866,487 9/1989 Ohuchi et al. .................. 271/291 X
4,878,087 10/1989 Sakai et al. ..................... 271/902 X
4,970,555 11/1990 Obana ............................ 355/318 X
4,974,033 11/1990 Yamada et al. ..................... 355/319

FOREIGN PATENT DOCUMENTS 0244740 12/1985 Japan .................................. 271/291

*Primary Examiner*—A. T. Grimley
*Assistant Examiner*—Sandra L. Brasé
*Attorney, Agent, or Firm*—Foley & Lardner

[57] ABSTRACT

A paper feeding mechanism for use in a printer apparatus, etc., includes upper and lower paper cassettes so provided as to be movable, a reverse guide provided below the lower paper cassette and having at least two divided parts, at least one of the divided parts being openable by moving the lowest paper cassette, and another reverse paper guide provided between the lower paper cassette and the upper paper cassette and having at least two parts of which at least one part is openable by moving the lower paper cassette. It is, therefore, possible to minimize an installation area occupied by the printer apparatus. Since the paper cassette is located in a spacing which is prepared against paper jamming, it is possible to make the printer compact as a whole.

4 Claims, 2 Drawing Sheets

IMAGE FORMING APPARATUS FOR FORMING AN IMAGE ON BOTH SIDES OF A RECORDING MEDIUM

BACKGROUND OF THE INVENTION

1. Field of the Invention

The present invention relates to a laser beam printer apparatus or an electrostatic copying machine and, in particular, a mechanism for printing an image on a material a plurality of times when it is done on a double-sided print or a multi-print mode.

2. Description of the Related Art

In general, an image forming apparatus, such as a laser beam printer apparatus, records image information on a photoconductor with the use of a laser beam and includes an image forming section for making image information visible and a paper feeding mechanism for feeding visible image information bearing paper to an image forming section. The image forming section records an electrostatic latent image on the photoconductor by ON/OFF controlling a laser beam, originating from a semiconductor laser, by an image information signal. The electrostatic latent image is visualized or developed, by an image forming unit, with the use of an image forming agent or toner. The developed image or toner image is transferred to the paper supplied through the paper feeding mechanism, and thermally fixed to the paper.

In this type of printer apparatus, a paper is supplied to an image forming section through paper cassettes where sheets of paper are stored according to their size. In this case, the paper cassettes are externally supplied via access slots which are provided at the end of the printer apparatus. In order to print the printer apparatus, it is necessary to secure a greater operation area than an area occupied by the apparatus itself.

In the printer apparatus, many spacings are provided which are necessary to remove paper from within the apparatus if the paper is jammed. Such spacings have to be increased if the printer apparatus is made for a double-sided print or multi-print mode. These spacings are sometimes not desirable, making the printer apparatus unduly bulky.

SUMMARY OF THE INVENTION

It is, accordingly, an object of the present invention to provide a mechanism for feeding a to be printed material, which enables a printer apparatus or copying machine to be made compact.

It is another object of the present invention to provide a mechanism for feeding a to be printed material, which can reduce an installation area taken up by an apparatus or machine.

According to the present invention, there is provided an image forming apparatus having an image forming section for transferring an image onto a piece of material, comprising first and second means, arranged in a stack, each for storing the material, means for feeding the piece of the material stored in one of the first and second storing means to the image forming section, means for temporarily holding the piece carrying the image transferred by the image forming section, and means, arranged between the first and second storing means, for conveying the image carrying piece temporaring held the holding means to the image forming section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

One embodiment of the present invention will be explained below with reference to the accompanying drawings.

Figure 1:
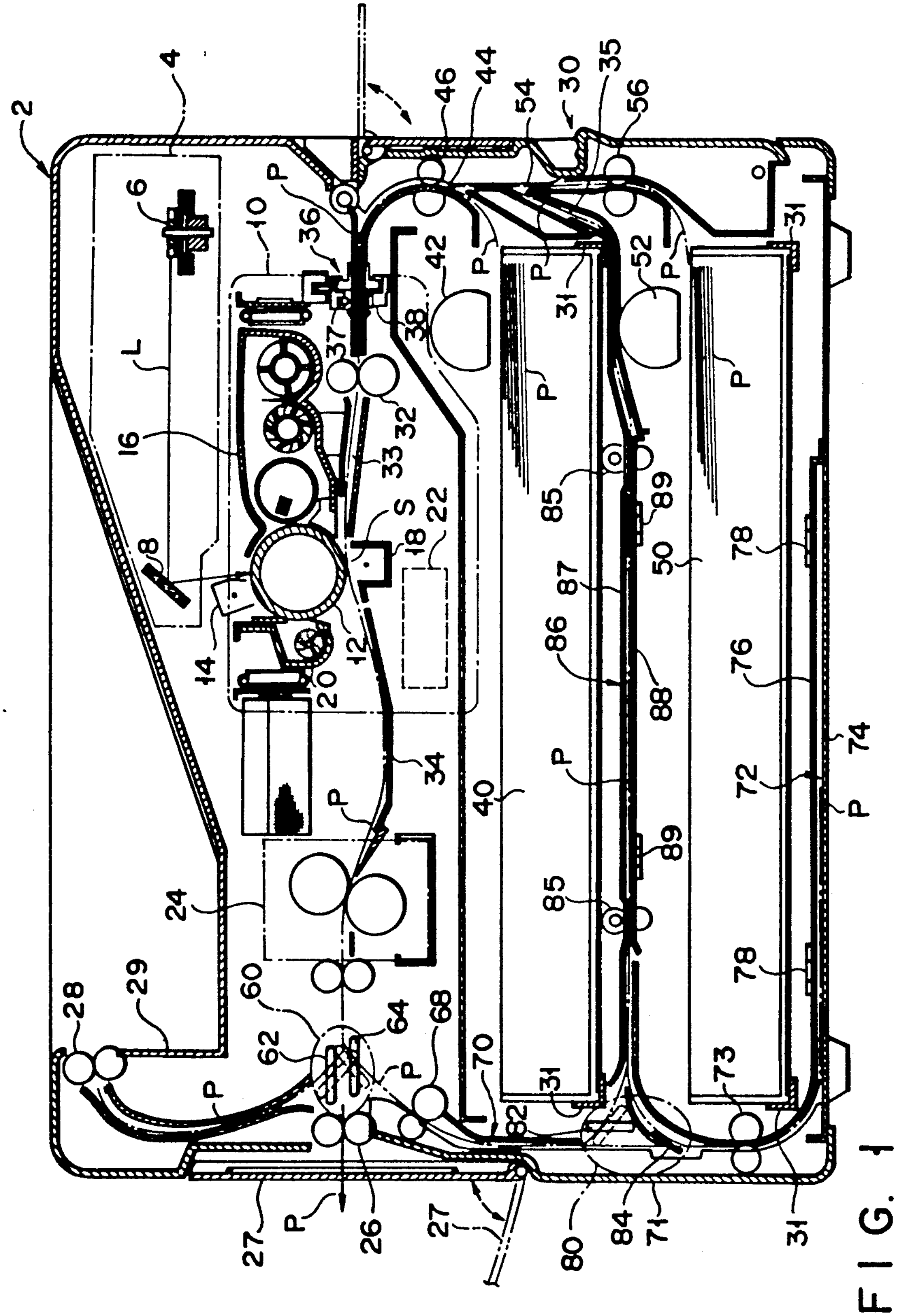
FIG. 1 is a cross-sectional view showing a laser beam printer apparatus including a mechanism, according to the present invention, for feeding a paper or other material.

Referring to FIG. 1, a laser beam printer apparatus 2 includes a laser scanning system 4 for directing a laser beam L toward a scanned object and a photoconductor 12, both of which allow the printing of a desired character or graphics, and an image forming section 10 for allowing image information which is supplied from the laser scanning system 4 to be formed as visual information and for forming the image information onto a material or paper P. Below the image forming section 10 are provided and arranged in a stack paper cassettes 40 and 50 each for holding a material or paper P and a feeding mechanism 30 for feeding paper P to the image forming section 10. This is the reason why the laser beam printer apparatus 2 is formed of a box-like outer configuration of less projections.

The laser scanning system 4 includes a semiconductor laser, not shown, for generating a laser beam L, a light deflection unit 6 for scanning the laser beam L coming from the semiconductor laser and a mirror 8 for reflecting the laser beam L toward the photoconductor 12.

The image forming section 10 includes, as one unit, the photoconductor 12 for allowing image information which is supplied by the laser beam L to be recorded as an electrostatic latent image, a charging device 14 for applying a desired charge to the photoconductor 12, a developer unit 16 for developing the latent image as formed on the photoconductor 12 to a visual image by an image visualizing agent or toner, not shown, a transferring unit 18 for transferring the visual image information to the paper P, a cleaning device 20 for neutralizing or erasing a residual toner, etc. The image forming section 10 further includes a laser controller 22 for converting the image information which is sent from an external apparatus, such as a host computer, to an image information signal and for controlling the laser beam L, coming from the semiconductor laser, in an ON or OFF fashion.

The paper cassettes 40 and 50, which are arranged in a stack with a traverse section 86 therebetween, are located below the image forming section 10 and adapted to hold paper P of the same or different size each. The cassettes 40, 50 are so supported that they can be drawn away from the printer apparatus 2 along guide rails 31, 31 provided on both sides of the cassettes. Feed rollers 42, 52 are provided on the leading-side of the paper P at a location of the cassettes 40, 50 to allow the paper P to be delivered sheet by sheet. Between the feed roller 42 or 52 and the image forming section 10, a paper guide 44 or 54 and a conveying roller pair 46 or 56 are located for guiding the paper P from the associated cassette 40 or 50 to the image forming section 10. Between the image forming section 10 and the conveying roller pair 46 or 56 a pair of resist rollers 32 are provided to correct the tilt of the paper P which is drawn from the cassette 40 or 50. A paper guide 33 is provided between the resist roller 32 and the photoconductor 12. A detecting device 36 is situated upstream of the resist roller pair, 32 or at a place nearer the paper cassettes 40, 50, to detect both edges of the paper P. The detecting device 36 is composed of light emitting and receiving elements 37 and 38, assembled as one unit, to detect a deviation, from a reference position, of the paper P whose tilt is corrected by the resist roller pair 32 or a deviation between the paper P and the laser beam L which is directed from the laser scanning system 4.

Downstream of the transferring unit 18 contained in the image forming section 10 or on a side opposite to that side of the photoconductor 12 where the paper P comes, a fixing unit 24 is arranged for fixing the paper P with a toner, not shown, transferred thereto. Between the fixing unit and the image forming section 10, a conveying guide 34 is provided to allow the paper P to be conveyed. Further downstream of the fixing unit 24 are provided a first delivery roller pair 26 and receiving tray 27 for delivering the toner-fixed paper P to an outside of the printer apparatus 2 and a second delivery roller pair 28 and a upper receiving tray 29.

Since the printer apparatus 2 has, in addition to a normal single-sided print function, a double-sided print or a multi-print function, a branch gate 60 is arranged between the fixing unit 24 and the first and second delivery rollers 26, 28 to selectively change the direction in which the paper P is conveyed. To the branch gate 60 are connected the first and second delivery roller pairs 26 and 28 as well as a conveying roller 68 and reverse guide 70 for directing the paper P again back toward the resist roller 32. The branch gate 60 is composed of a switching mechanism having upper and lower claws 62 and 64 as one unit and defines a direction, by the claws 62, 64, in which the paper P is directed.

The reverse guide 70 extends far below the cassettes 40, 50. The reverse guide 70 is connected to a temporary storage section 72 to have a spacing enough to accommodate a maximum length one of printable paper sheets and necessary to revert the paper P. Between the reverse guide 70 and the storage section 72, a switching gate 80 is located to allow that paper P which has one side printed to be directed again back to the image forming section 10. The switching gate 80 is equipped with a claw 82 and reed 84 as one unit, the reed 84 being formed of a Mylar fim, polyester film, elastic sheet, etc. The switching gate 80, like the branch gate 60, defines the direction, by claw 82, in which the paper P moves. The switching gate 80 is connected to a traverse section 86, arranged between the cassettes 40 and 50, to direct the paper P back to the image forming section 10 or the resist roller 32. Between the storage section 72 and the reverse guide 70, reversible conveying rollers 73 are provided to allow the paper P to be conveyed to and from the temporary storage section 72. A plurality of conveying rollers 85 are arranged on the traverse section 86 to allow the paper P to be directed back toward the resist roller 32. The traverse section 86 is connected to a paper guide 35 to allow paper P which comes from the cassette 50 to meet the paper guide 54, the paper guide 54 being utilized for feeding the paper P from the cassette 50.

The temporary storage section 72 is defined by a frame member 74, that is part of the body section of the printer apparatus 2, and a paper guide 76 located opposite to the frame member 74. Since the paper guide 76 is supported by a hinge 78 to allow it to be swung upwardly, the storage section 72 can be opened as required. The traverse section 86 is provided by a partition member 87, which is a part of the printer apparatus 2, and paper guide 88 disposed opposite to the partition member 87. The upper cassette 40 is arranged above the partition member 87, while the lower cassette 50 is arranged below the partition member 87. The paper guide 88 is so supported that it can be swung downward by a hinge 89. Thus the traverse section 86 can be opened as required.

Upon receipt of a print initiation signal and image information data from, for example, an external unit, or a host computer or word processor, not shown, the laser beam printer apparatus 2 initiates a printing operation for forming image information on paper P. The laser controller 22 converts image information data to an image information signal and controls a laser beam L in an ON-OFF fashion which is emitted from the semiconductor laser. At the same time, a motor, not shown, is driven to allow the photoconductor 12 to be rotated at a desired speed of rotation. The photoconductor 12 is electrically charged by the charging device 14 to a desired voltage. A laser beam L which is ON-OFF controlled by the image information signal is directed via the laser scanning system 4 on the charged surface of the photoconductor 12 to allow an electrostatic latent image to be recorded on the surface of the photoconductor 12. The electrostatic latent image is either supplied with a toner, not shown, from the developing unit 16 and converted to a toner image, not shown.

In parallel with the aforementioned operation, paper P is fed sheet by sheet from either one of the cassettes 40 and 50 toward the corresponding feed roller or 52. The paper P is supplied from the cassette 40 or 50 toward the image forming section 10 via the paper guide 44 or 54 and conveying roller pair 46 or 56 and the paper P has its own tilt corrected by the resist roller pair 32. The paper P temporarily rests at the location of the resist roller pair 32 and then is fed forward in synchronization with the image information signal supplied from the laser beam L or with the rotation of the photoconductor 12.

The paper P as fed in synchronization with the rotation of a toner image or photoconductor 12 is conveyed to a location between the photoconductor 12 and the transferring unit 18, i.e., a transferring section S, through the paper guide 33. At the location of the transferring section S, the toner image is transferred to the paper P.

The paper P, having a toner image transferred, is separated from the photoconductor 12 and fed to the fixing unit 24 via the conveying guide 34. The toner image is exposed by the fixing unit 24 to a heat of about 180° C. to allow it to be melted on the paper P.

In an ordinary single-sided print mode, the paper P is delivered to the receiving tray 27 or upper receiving tray 29 by the branch gate 60 or by a combination of the claws 62 and 64, that is, a combination of the claws 62 and 64 as indicated by a dotted line and solid line, respectively, and a combination of the caws 62 and 64 as indicated by the solid lines respectively. In a double-sided print or multi-print mode, the paper P is guided to the conveying roller pair 68, and then to the reverse guide 70, in accordance with a combination of the claws 62 and 64, that is a combination of the claws 62 and 64 as indicated by a solid line and dotted line, respectively.

In the double-sided print mode, that paper P which is guided into the reverse guide 70 after printing has been made on one side of the paper P is guided into the storage section 72 through the conveying roller 73. At this time, the switching gate 80 or claw 82 is switched in a direction as indicted by the solid line. The paper P has its rear-side drawn back by the reverse rotation of the conveying roller 73 and, with the leading-side and rear-side of the paper P reversed, the reverted paper P is again fed through the switching gate 80 into the traverse section 86 arranged between the cassettes 40 and 50. In this case, the switching gate 80 or reed 84 prevents the paper P from being guided toward the reverse guide 70. For example, since the reed 84 has its openable-side directed to the storage section 72, if the paper P is directed from the reverse guide 70 toward the storage section 72, the paper P is so guided. If, on the other hand, the paper P is drawn back from the storage section 72, it is stopped by the reed 84 and guided toward the traverse section 86. As appreciated from the above, the paper P has its moving direction positively switched into the traverse section 86. The paper P which is placed on the traverse section 86 is guided, by the rotation of the conveying roller 85, into the paper guide 35 and again toward the resist roller 32 via the paper guide 54 and feed roller 42 in which case a to be printed side of the paper P corresponds to a rear-side of the paper P.

In the multi-print mode, that paper P which is guided into the reverse guide 70 with one side thereof already printed is placed into the traverse section 86 through the switching gate 80 or claw 82 in which case the claw 82 is switched in a direction as indicated by the dotted line. The paper P thus placed is guided, as in the double-sided print mode, into the paper guide 35 past the paper guide 35 and then guided into the resist roller 32 via the paper guide 54 and feed roler 42 in which case a to be printed side of the paper P corresponds to the already printed side of the paper P.

The paper P which is led to the resist roller 32 with one side thereof printed is conveyed to the transferring section S where a toner image is transferred to the paper P. The paper P is further conveyed to the fixing unit 24, where the transferred image is fixed, and delivered via the receiving tray 27 or the upper receiving tray 29 for delivery.

In the multi-print mode, the paper P is guided along the traverse section 86 further more, the paper P may be many times overprinted in the same way as set out above.

There is a risk that, in the double-sided print mode or multi-print mode as set out above, the paper P as fed from the traverse section 86 will be liable to be more displaced crosswise of the paper P than the paper P which is fed from the cassettes 40 and 50. In the double-sided print mode or multi print mode, the detecting device 36 detects a deviation of the paper P which has its tilt corrected by the resist roller pair 32 from a reference position. This deviation is fed back to the laser controller 22 to correct the starting point from which the laser beam L coming from the laser scanning system 4 scans. By so doing, it is possible to eliminate a displacement between the laser beam L and that paper P, in terms of the crosswise direction of paper P, which is conveyed from the traverse section 86.

When paper P is to be newly supplied into the cassettes 40 and 50, a front cover, not shown, is opened with respect to the printer apparatus 2. It is thus possible to draw the cassettes 40 and 50 in the forward direction, that is, to draw the cassettes 40 and 50 forward along the guide rails 31. Paper P can readily be inserted into the cassettes 40 and 50 with the cassettes projected forward from the apparatus 2. These cassettes can exactly and efficiently be pushed, along the guide rails 31, back into the apparatus.

In the case where the paper P is jammed in the traverse section 86 and/or storage section 72, the lower cassette 50 is drawn forward from the printer apparatus 2 in the same way as the case where the paper P is newly supplied in the cassette. Since the lower cassette 50 is drawn out, a greater access space is provided the interior of the printer apparatus 2, i.e., between the traverse section 86 and the storage section 72. If, in this state, the paper guide 88 which constitutes part of the traverse section 86 is swung down or paper guide 76 is rotational opened, then it is possible to readily eliminate the paper P as jammed in the both section 72, 86. If, on the other hand, the paper P is jammed in the reverse guide 70, then the left lower cover 71 which constitutes part of the apparatus body serving as a paper guide can be opened so that the jammed paper P can be removed from within the apparatus 2.

Figure 2:
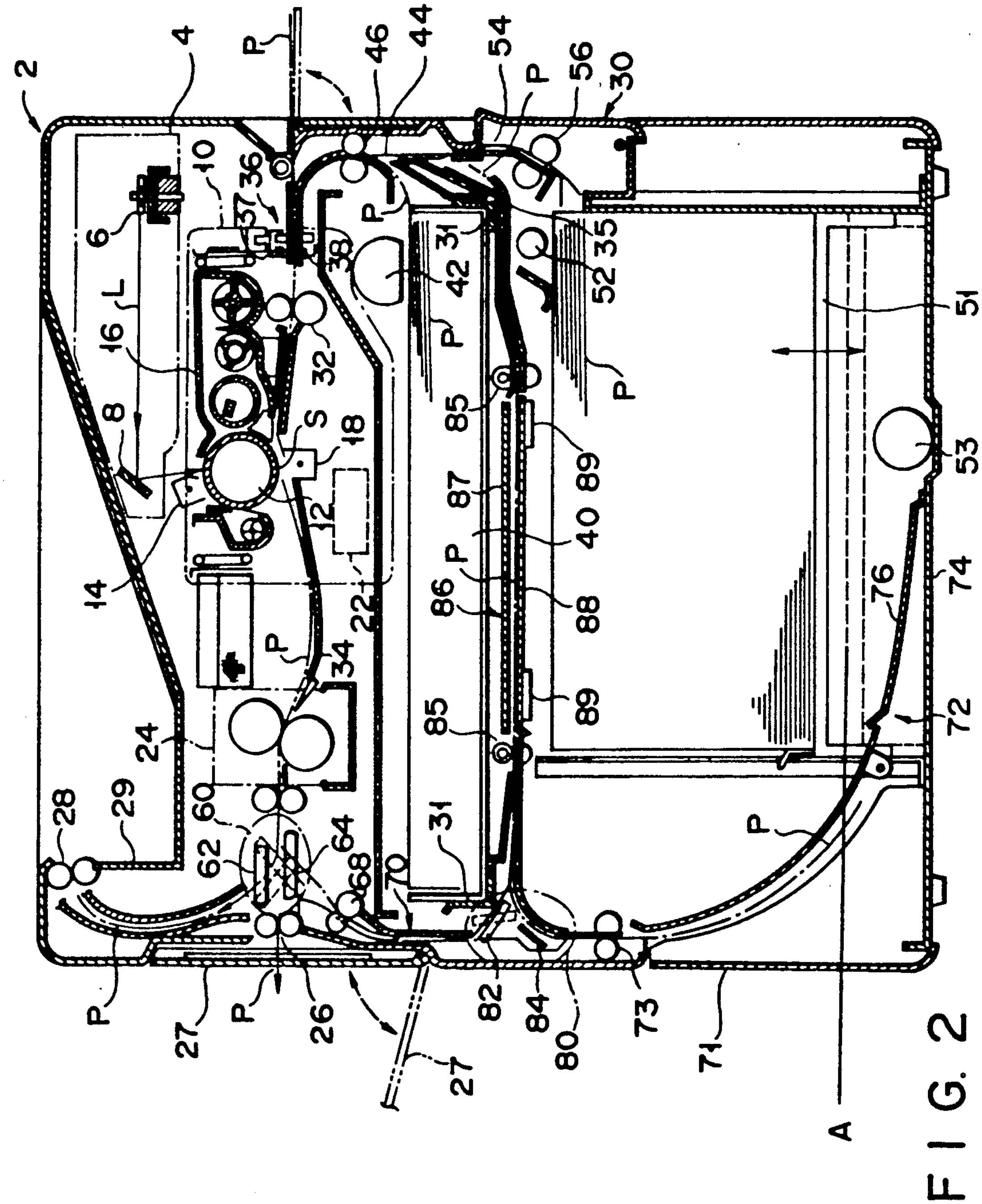
FIG. 2 is a cross-sectional view showing a laser beam printer apparatus including a feeding mechanism.

FIG. 2 shows another embodiment of the present invention.

A laser beam printer apparatus 2 includes a paper deck 51 which is located below a traverse section 86 or at a location corresponding to the lower cassette 50 as shown in FIG. 1 to hold more paper P. The paper deck 51 can keep 1500 to 2500 sheets of paper P as one suppling-unit. The paper deck 51 is moved by a motor 53 in an up/down direction. As the sheets of paper P are sequentially delivered with image information printed thereon, that is, are sequentially decreased at the location of the paper deck, the paper deck 51 is moved by the motor 53 up to a corresponding extent, meaning that the top sheet of paper P to be sequentially fed is held at a given height at all times at the location of the paper deck 51. If paper P is newly supplied on the deck 51 and the front cover, not shown, is opened, the deck 51 is down, by the rotation of the motor 53, to a location near the frame member 74 constituting part of the apparatus or to a level A as shown in FIG. 2, in which case a greater access spacing is provided between the traverse section 86 and the deck 51. In this state, it is possible to readily eliminate paper P as jammed in the traverse section 86 by the down-swing operation of a paper guide 88 constituting part of the traverse section 86.

As set out above, according to the present invention, a laser beam printer apparatus has paper cassettes held in an apparatus body and a reverse paper guide defined relative to the paper cassette to allow paper P to be reversed, whereby it is possible to print different image information on paper a plurality of times. Stated in another way, any undesired space or gap is eliminated from the interior of the apparatus, ensuring a compact apparatus as a whole. Further, the apparatus is constructed as a box-like unit of less projections. Thus it is possible to install a laser beam printer apparatus without the need of paying any other associated factors except for the size of the apparatus body.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept a defined by the appended claims and their equivalents.

What is claimed is:

1. An image forming apparatus for forming an image on both sides of a recording medium, comprising:

means for forming an image on the recording medium;

first and second storing means arranged in a stack, for storing the recording medium, respectively, the first storing means being located below the second storing means;

first feeding means for feeding the recording medium stored in one of the first and second storing means to the forming means so as to form the image on one side of the recording medium;

means, located below the first storing means, for temporarily stacking the recording medium on one side of which the image has been formed by the forming means; and second feeding means, located between the first storing means and the second storing means, for feeding the recording medium stacked by the stacking means to the forming means so as to form the image on the other side of the recording medium.

2. The image forming apparatus according to claim 1, further comprising means for moving the first and second storing means to open the second feeding means.

3. The image forming apparatus according to claim 1, further comprising means for selecting either the stacking means and the second feeding means, the recording medium being transferred to the one of the stacking means and the second feeding means selected by the selecting means.

4. The image forming apparatus according to claim 1, further comprising means for selecting either the first or second feeding means, the recording medium being transferred to the one of the first and second feeding means which is selected by the selecting means.

* * * * *